Figure 1:
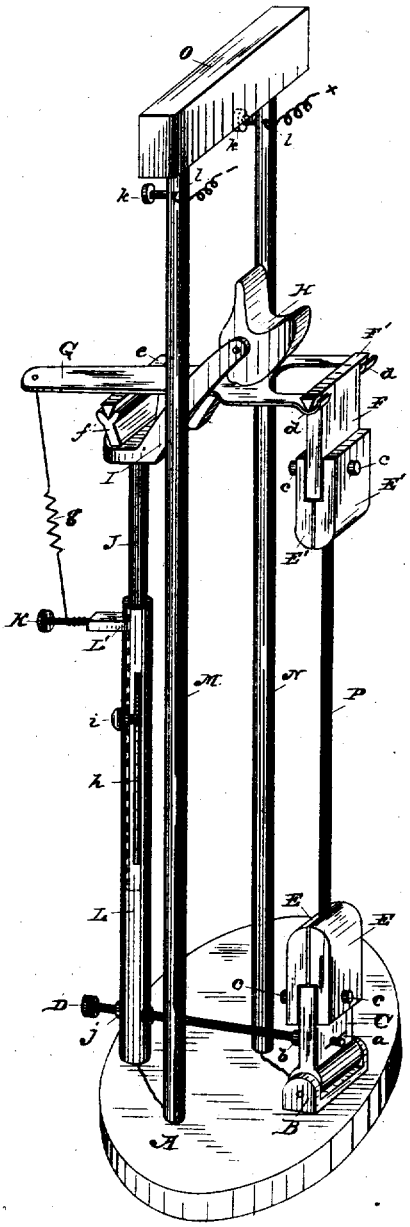

W. SAWYER,

Assignor to THE EASTERN ELECTRIC MANUFACTURING COMPANY.

APPARATUS FOR TREATING CARBON PENCILS FOR ELECTRIC LIGHTS.

No. 9,807. Reissued July 19, 1881.

Witnesses
Wm. Johnston
Hm. McGill

Inventor
William Sawyer
By J. H. MacDonald
Atty

N. PETERS, Photo-Lithographer, Washington, D. C.

UNITED STATES PATENT OFFICE.

WILLIAM SAWYER, OF NEW YORK, N. Y., ASSIGNOR TO THE EASTERN ELECTRIC MANUFACTURING COMPANY, OF MIDDLETOWN, CONN.

APPARATUS FOR TREATING CARBON PENCILS FOR ELECTRIC LIGHTS.

SPECIFICATION forming part of Reissued Letters Patent No. 9,807, dated July 19, 1881.

Original No. 224,612, dated February 17, 1880. Application for reissue filed May 26, 1881.

*To all whom it may concern:*

Be it known that I, WILLIAM SAWYER, of New York, in the county of New York and State of New York, have invented certain new and useful Improvements in Apparatus for Treating Carbon Pencils for Electric Lights; and I do hereby declare that the following is a full, clear, and exact description of the invention, that will enable others skilled in the art to which it appertains to make and use the same, reference being had to the accompanying drawing, and to the letters of reference marked thereon, which form a part of this specification.

When a pencil of carbon immersed in a hydrocarbon gas or liquid is heated to incandescence by the passage of an electric current the hydrocarbon is decomposed and a coating of pure carbon is deposited upon the pencil. In hardness, density, and homogeneity this deposit is superior to ordinary carbon, and is especially valuable for use in electric lamps operating upon the principle of incandescence.

In order to render the pencil of carbon incandescent its ends must be connected with the poles of a generator of electricity; and inasmuch as there is considerable expansion of the carbon under the heat to which it is subjected it has heretofore been extremely difficult to obtain smooth, straight pencils.

The object of my invention is to obviate the difficulties that have been experienced, and I accomplish my purpose by putting the pencil under tension during treatment, whereby expansion is allowed for and the pencil drawn and kept straight.

Referring to the drawing accompanying and forming a part of this specification, A is a soapstone or other insulating base, to which are secured two parallel rods, M N, which, at their upper ends, are secured into an insulating cross-bar, O. These rods are thus insulated from each other, and by means of the holes *l l* and set-screws *k k* they are connected with the wires leading from the + and — poles of the generator of electricity.

C is a piece of metal hinged in the frame B, and carrying two carbon clamps, E E, which are held in place by screws *c c*. The vertical position of the clamping apparatus is maintained or adjusted by means of thumb-screw D, provided with shoulder *b* and pin *a*. This thumb-screw is insulated in L by hard-rubber bushing *j*.

L is a tube secured to base A, having a slot, *h*, running a portion of its length. In this tube slides a rod, J, which is secured in any position by means of set-screw *i*. Upon the top of the rod J, and fixed to it is a flaring grooved piece, *f*, in which works the V-shaped cross-piece *e*, attached to lever G. The two ends *d d* of the forked portion G′ of lever G are also grooved, and in this groove works the V-shaped cross-piece F′, fixed to metal piece F. The cam H, pivoted in the forked piece I, fixed to rod J, serves to control the movements of the lever G, which is brought up against the cam H by the retractile force of spring *g*, adjustable by screw K, working in offset L′ of tube L.

Attached to the piece F, and held in place by set-screws *c′ c′*, are two carbon clamping-pieces, E′ E′.

The operation of treating a pencil of carbon is as follows: Primarily the forked end of lever G is depressed by throwing down the cam H. Then one end of the pencil of carbon P to be treated is clamped between the carbons E′ E′. The piece F is then placed in position, as shown in the drawing, and the lower end of the pencil is swung between the clamping-carbons E E, which are adjusted by thumb-screw D, so that the pencil hangs vertically. The lower end of the pencil is then clamped in E E. Next the cam H is thrown up, when the spring *g*, by its action to elevate the clamp E′ E′, puts a tension upon the pencil P, which draws and keeps it straight. Lastly, the whole apparatus is immersed in a bath of, preferably, olive-oil to a depth sufficient to cover the carbon clamps E′ E′, and the current of electricity applied. Traversing the rod M, the current passes, by means of a wire-connection, to tube L and rod J, and, by way of *f e* G *d* F and the clamps E′ E′, to the pencil P and the clamps E E, and thence, by way of C B and the rod N, outward. The pencil is rendered incandescent, is increased in length by expansion about one thirty-second of its original length, and, being drawn taut by the action of spring *g*, emerges from the bath when the current is cut off preferably straight and coated with a fine even deposit of the densest carbon.

Having thus fully described my invention, what I claim as such, and desire to secure by Letters Patent, is—

1. In mechanism for electrically treating carbon pencils, the combination, with two upper and lower carbon clamps, of a base and supporting mechanism for the clamps, the lower clamps being adjustably supported on the base, the upper carbons being vertically adjustable with relation to the lower carbons, whereby tension may be placed on the carbon pencils during treatment, substantially as described.

2. In apparatus for treating carbon pencils electrically, the combination, with a frame, B, secured to the base, and a hinged metallic piece, C, to which the lower carbon clamps are secured, of the upper carbon clamps vertically adjustable, substantially as described, and for the purpose set forth.

3. The combination, with the upper carbon clamps secured to a metal piece pivoted in the inner ends of a forked lever, having one end of a retractile spring secured to the lever, of mechanism for elevating and depressing said lever and the upper carbon clamps, substantially as described.

4. In apparatus for electrically treating carbon pencils, substantially as described, the combination of the end connections, E E and E′ E′, the lever G, and cam H.

5. In apparatus for electrically treating carbon pencils, substantially as described, a connection with the pencil or pencils to be treated so constructed and arranged as to put a tension upon the pencil or pencils during treatment.

6. The method of treating carbon pencils which consists in electrically heating the same while immersed in liquid hydrocarbon and subjected to longitudinal tension or strain between adjustable clamps adapted to maintain automatic tension.

7. A carbon pencil for electric lights treated substantially as described.

In testimony whereof I affix my signature in presence of two witnesses.

WM. SAWYER.

Witnesses:
F. W. HANAFORD,
WORTH OSGOOD.